US006981787B2

(12) United States Patent
Brown

(10) Patent No.: US 6,981,787 B2
(45) Date of Patent: Jan. 3, 2006

(54) ELECTRIC CONTROL FOR AUTOMOBILE HEADLIGHTS

(75) Inventor: Heather Steiner Brown, Birmingham, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 246 days.

(21) Appl. No.: 10/025,585

(22) Filed: Dec. 18, 2001

(65) Prior Publication Data

US 2003/0112631 A1    Jun. 19, 2003

(51) Int. Cl.
*B60Q 1/076*      (2006.01)

(52) U.S. Cl. ............... 362/467; 362/276; 362/802

(58) Field of Classification Search ........... 362/38, 362/41, 43, 464–468, 276, 802; 73/514.05, 73/514.06, 514.09; 340/429, 438
See application file for complete search history.

(56) References Cited

U.S. PATENT DOCUMENTS

| | | | | |
|---|---|---|---|---|
| 3,056,303 A | * | 10/1962 | Naylor | 74/5.34 |
| 4,528,851 A | | 7/1985 | Ozols | 73/514 |
| 4,676,103 A | | 6/1987 | Nakajima | 73/514 |
| 4,707,927 A | | 11/1987 | Hiyama | 33/366 |
| 4,932,266 A | | 6/1990 | Bauer et al. | 73/727 |
| 5,526,242 A | * | 6/1996 | Takahashi et al. | 362/466 |
| 5,581,034 A | * | 12/1996 | Dao et al. | 73/514.09 |
| 5,787,370 A | | 7/1998 | Kutscher et al. | |
| 6,087,936 A | * | 7/2000 | Woods | 340/566 |
| 6,130,506 A | * | 10/2000 | Lopez et al. | 315/82 |
| 6,142,655 A | * | 11/2000 | Zillgitt et al. | 362/466 |
| 6,302,553 B1 | * | 10/2001 | Izawa | 362/37 |
| 6,377,166 B1 | * | 4/2002 | Cauchi | 340/429 |

FOREIGN PATENT DOCUMENTS

| | | |
|---|---|---|
| EP | 0 652 134 A1 | 5/1995 |
| JP | 7-232589 A | 9/1995 |
| JP | 7-277068 | 10/1995 |
| WO | WO96/18524 | 6/1996 |

\* cited by examiner

*Primary Examiner*—John Anthony Ward
*Assistant Examiner*—Peggy A. Neils
(74) *Attorney, Agent, or Firm*—Brinks, Hofer, Gilson & Lione

(57) ABSTRACT

An electronic control for automobile headlights utilizing a spherical sensor comprised of a metal ball surrounded by a fluid encapsulated in a spherical sensor, which is connected to the spherical sensor system. Computer controlled unit is positioned on and close behind the headlight so that the metal ball cooperate with sensors within the spherical sensor system to make the headlight go so as to follow the car during turns.

8 Claims, 2 Drawing Sheets

ELECTRIC CONTROL FOR AUTOMOBILE HEADLIGHTS

TECHNICAL FIELD OF THE INVENTION

The present invention simplifies Adaptive Frontlighting Systems (AFS) for movable headlights for automobiles.

BACKGROUND OF THE INVENTION

Currently AFS systems consist of sensors that typically detect steering angle, vehicle speed, and other parameters that feed signals into an electronic control unit (ECU). The ECU logic processes these signals and then sends the appropriate input into stepper motors that reposition the lighting units within the headlights. The primary objective of AFS is to cause the headlights to be aimed in the direction of travel in turning maneuvers and to be aimed properly in differing vehicle loading conditions. Prior art AFS typically use an ECU located in the trunk of the automobile. Prior art systems require a large amount of wiring needed to connect all of the sensors to the ECU. It would be desirable to move the ECU to the front of the automobile, eliminate the need for one or both of the steering and speed sensors, and reduce the amount of wires in the system.

BRIEF SUMMARY OF THE INVENTION

The electric control for automobile headlights of this invention consists of an acceleration sensor that detects acceleration loads in two dimensions. The acceleration sensor of this invention includes a metallic ball surrounded by a viscous fluid encapsulated by a polycarbonate sphere. When the vehicle accelerates, either in the longitudinal or lateral directions, a pressure transducer on the inside of the sphere will measure the pressure caused by the ball's motion against the wall of the sphere. Certain pressure levels corresponding to certain acceleration conditions will be processed by the ECU and cause the appropriate headlight movement. By sensing lateral accelerations, the acceleration sensor (or accelerometer) will replace the steering wheel sensor. This encapsulated ball system comprising the acceleration sensor will sit on top of the ECU behind the headlight system with wires connecting the sensor to the ECU.

A typical current design of AFS consists of steering, speed and instrument panel controls that feed input into an electronic unit. The ECU processes these signals and sends an input into stepper motors that adjust the position of the headlight units.

In accordance with this invention, the spherical capsule comprising the acceleration sensor sits on a polycarbonate tubular stand that is connected to an electronic control unit (ECU). This entire system is located behind the headlights of the car. Preferably, the height of the spherical capsule plus the tubular stand is approximately three inches. The friction between the ball and the fluid should be as low as possible, therefore the ball's surface coefficient of friction and the viscosity of this fluid should be low. When the vehicle accelerates forward, the sphere will push toward the rear wall of the sphere. When the vehicle turns, the sphere will push toward the side wall of the sphere.

Built into the walls of the polycarbonate sphere are two sensors. One sensor is located at the point of the sphere that faces the back of the vehicle. When the vehicle accelerates, this sensor will measure the pressure caused by the ball's fore and aft (or longitudinal) motion against the wall of the sphere. Each level of pressure that is read by this sensor is proportional to the acceleration of the car that tend to cause the vehicle to pitch backward which causes a headlight aiming error unless compensated. These pressure readings are sent via wires to the ECU.

The ECU processes these signals and sends the appropriate signals to the stepper motors that control the headlight unit movement. This sensor replaces the steering wheel sensor found in a traditional AFS system. The other sensor in this invention is also built into the wall of the sphere capsule. When the vehicle turns, this sensor will read the position of the ball. Certain ball positions (corresponding to certain steering wheel positions) will be processed by the ECU and cause the appropriate headlight movement.

In light of the above, it is apparent that the AFS spherical sensor system of this invention enhances the early AFS system by placing the ECU closely behind the headlight to be controlled and requires fewer external inputs to operate. Furthermore, the large amount of wiring heretofore required is now not needed.

Other general and more specific aspects of this invention will be set forth in the ensuing description and claims.

DETAILED DESCRIPTION OF THE PREFERRED EMBODIMENT

Figure 1:
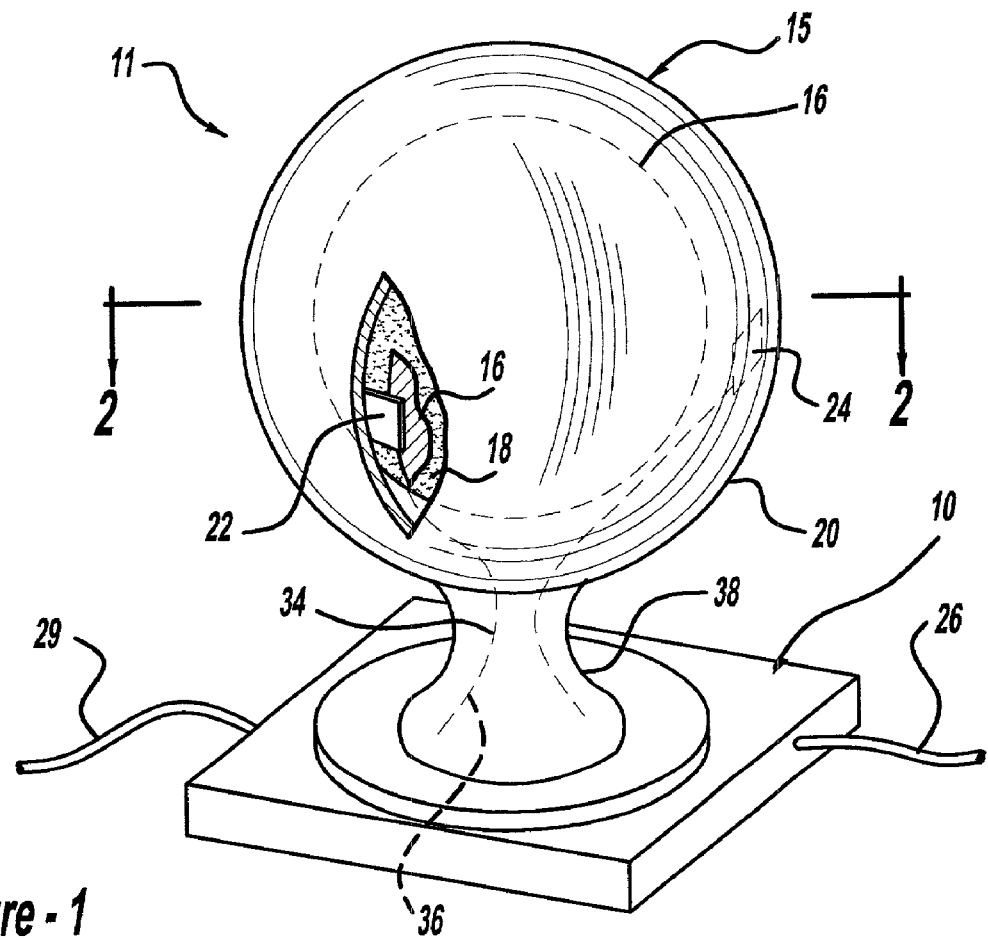
FIG. 1 is a perspective view of the AFS system of this invention showing the sensor of the device mounted on the electronical control unit (ECU)
Figure 2:
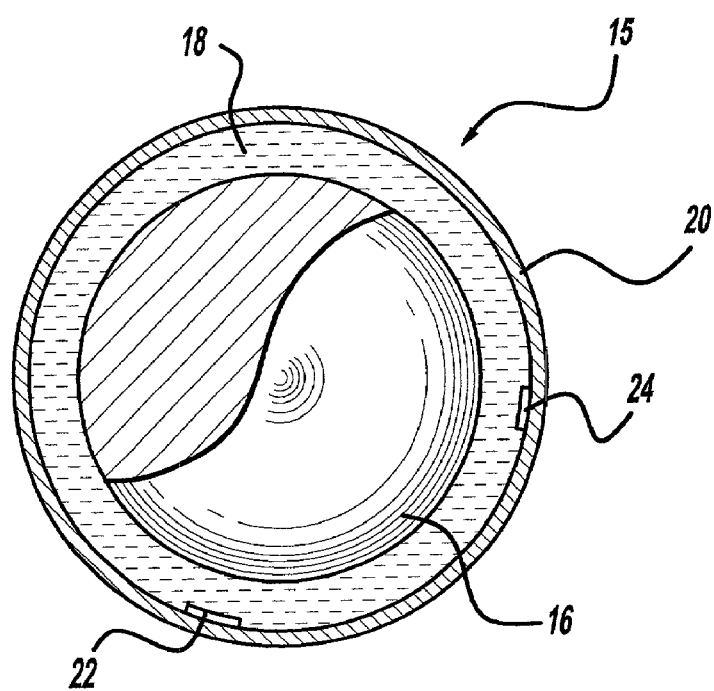
FIG. 2 is a sectional view of the sensor as seen from the lines 2—2 in FIG. 1.

The following description of the preferred embodiment of the invention is not intended to limit the scope of the invention that is described, but rather to enable a person skilled in the art to make and use the invention. Referring to the drawings, like reference numerals are used to designate like parts throughout.

Looking first at FIG. 1, the AFS of the present invention is identified by reference number 11 and includes an electronical control unit (ECU) 10 mounted to the vehicle 12 in a position closely behind the headlight 14 of the vehicle 12. The spherical sensor system 15 consists of a metallic ball 16 surrounded by a viscous fluid 18 encapsulated by a polycarbonate sphere 20.

The friction between the ball 16 and the fluid 18 and the viscosity of the fluid 18 is very low. Built into the internal wall of the polycarbonate sphere 20 are two sensors 22 and 24. Sensors 22 and 24 detect pressure changes within sphere 20 exerted by viscous fluid 18. Pressure sensors 20 and 22 are located at 90 degree offset positions. Accordingly, any movement of ball 16 within sphere 20 causes associated pressure changes that can be either positive or negative pressure changes, depending on the direction of movement of the ball. It may further be possible to provide sensors 22 and 24 that are capable of measuring relative rotation between sphere 20 and ball 16. This provides another means for detecting turning of the vehicle since ball 16 will by its inertia tend to maintain stationary whereas the vehicle 12 and sphere 20 are rotated. Sensor 22 is located at the point of the ball 16 that faces the back of the sphere. This pressure sensor 24 may in many applications replace the speed sensor. Certain pressure levels will be processed by the ECU and cause the appropriate headlight movement. When the vehicle turns, sensor 24 will read the position of the ball 16. The position sensor will replace the steering wheel sensor. Certain ball positions (corresponding to certain steering wheel positions) will be processed by the ECU and cause the appropriate headlight movement.

In addition to sensors 22 and 24 that measure pressure changes, other types of sensors could be used. For example, proximity type sensors or light wave based sensors could be used, so long as they are capable of detecting the movement of a mass such as ball 16. Moreover, it is further possible to use individual accelerometers to measure longitudinal and lateral accelerations. A simplified version of AFS 11 would measure only lateral accelerations, which could replace the need for a steering wheel angle input.

Figure 3:
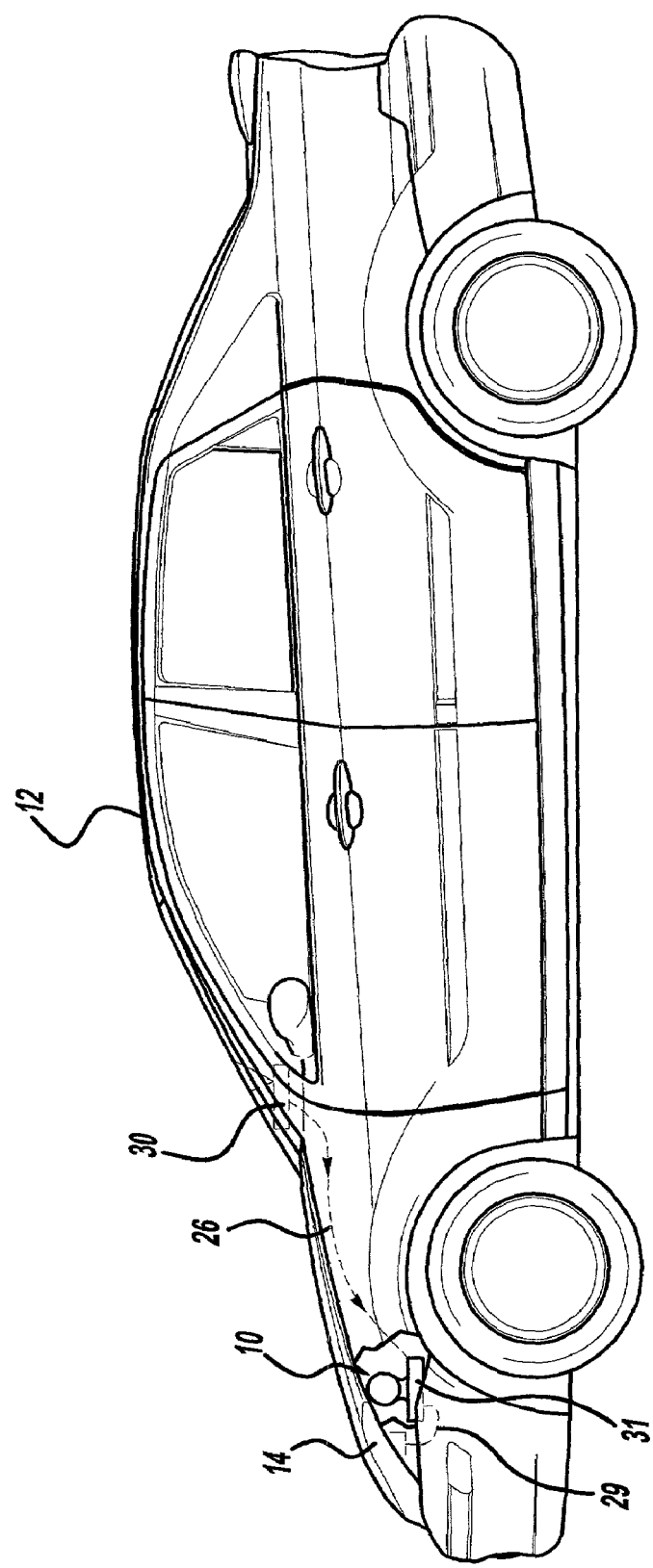
FIG. 3 is a side view of an automobile and the AFS mounted to the automobile.

This encapsulated ball system will sit on top of the ECU 10 behind the headlight 14, with wire 26 (FIG. 3) connecting the instrument panel 30 where the headlights are turned on and off. The ECU 10 processes signals from sensor system 15 and controls on the instrument panel 30 and sends an input into stepper motors (not shown) that adjust the position of the headlight units.

The wires 34 and 36 connect sensors 22 and 24 with the ECU 10, which signals the headlight 14 via the wiring 29.

It is pointed out that the sensor system 15 sits on the ECU 10. The height of the sensor system 15 plus the ECU 10 is approximately three inches. The friction between the ball 16 and the fluid 18 should be as low as possible. Therefore, the balls surface coefficient of friction and the viscosity of the fluid should be low.

The foregoing discussion discloses and describes a preferred embodiment of the invention. One skilled in the art will readily recognize from such discussion and from the accompanying drawings and claims that changes and modifications can be made to the invention without departing from the true spirit and fair scope of the invention as defined in the following claims. The invention has been described in an illustrative manner and it is to be understood that the terminology that has been used is intended to be in the nature of words and description rather than of limitation.

What is claimed is:

1. A vehicle adaptive frontlighting system for changing the direction of the light emitted by a headlight system in a vehicle, the frontlighting system comprising:
    a movable headlight;
    an electronic control unit located proximate to the movable headlight and connectable to the moveable headlight;
    a housing having a metallic sphere, wherein the housing is mounted on the electronic control unit, wherein the metallic sphere moves within the housing based on an acceleration by the vehicle; and
    at least one sensor mounted to the housing and connectable to the electronic control unit, wherein the sensor measures the movement of the metallic sphere, thereby moving the movable headlight without an input measuring a steering wheel angle of the vehicle;
    wherein the housing further comprises a viscous liquid surrounding the metallic sphere;
    wherein the friction between the metallic sphere and the viscous liquid is low, such pressure exerted by the viscous fluid when the metallic sphere moves within the housing;
    wherein the at least one sensor measures the pressure exerted by the viscous liquid.

2. The frontlighting system of claim 1, wherein the vehicle acceleration moves the metallic spere towards the rear of the housing.

3. The frontlighting system of claim 1, wherein the vehicle turning moves the metallic sphere towards a side of the housing.

4. The frontlighting system of claim 1, wherein the at least one sensor is located at the back of the housing to detect a longitudinal acceleration by the vehicle.

5. The frontlighting system of claim 1, further comprising a second sensor located on a side of the housing to detect a lateral acceleration by the vehicle.

6. A vehicle adaptive frontlighting system for moving headlights of a vehicle depending on the vehicle acceleration, the system comprising:
    an electronic control unit positioned proximate to the moving headlights and connectable to the moving headlights;
    a housing mounted on the electronic control unit;
    a metallic sphere disposed inside the housing, wherein the metallic sphere moves inside the housing, based on vehicle acceleration;
    a first sensor connectable to the electronic control unit and located in the housing for detecting a lateral movement of the metallic sphere; and
    a second sensor connectable to the electronic control unit and located in the housing for detecting the horizontal movement of the metallic sphere;
    wherein the housing further comprises a viscous fluid surrounding the housing;
    wherein the movement of the metallic sphere results in pressure being exerted by the viscous liquid; and
    wherein the first and the second sensor measure the pressure exerted by the viscous fluid.

7. The system of claim 6, wherein the first sensor is located on a side portion of the housing.

8. The system of claim 6, wherein the second sensor is located on a rear portion of the housing.

* * * * *